July 21, 1959    O. A. WRIGHT    2,895,758
MECHANICAL COMPENSATOR
Filed June 9, 1954
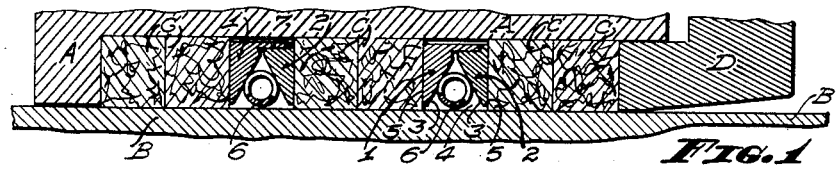
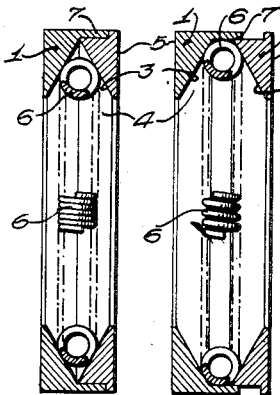
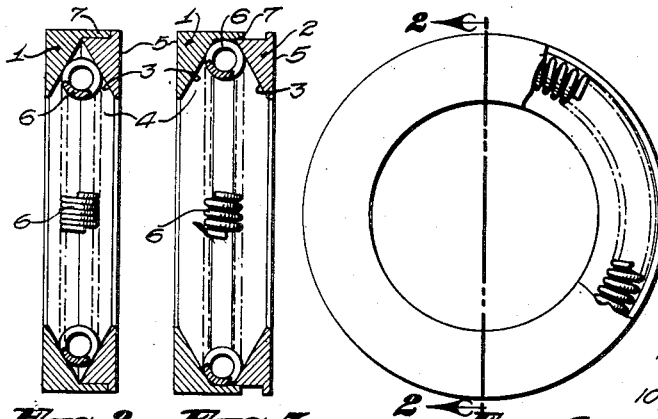
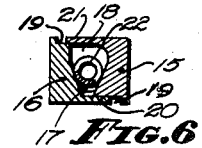
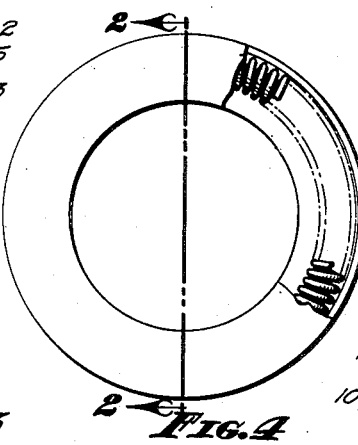
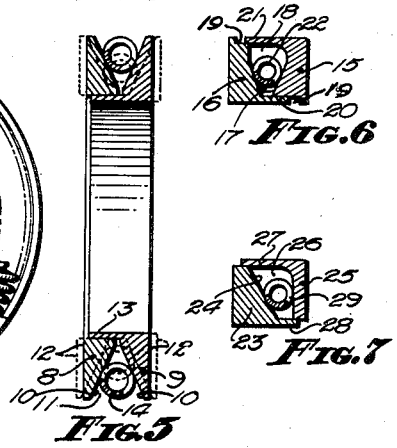
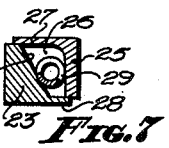
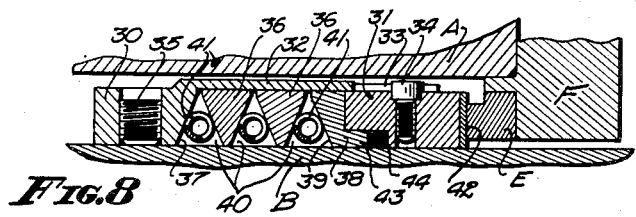
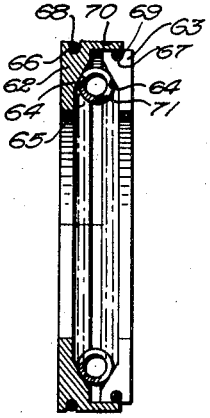
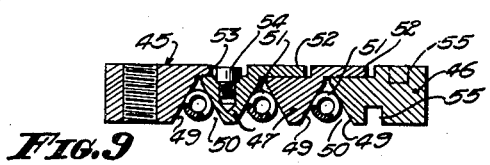
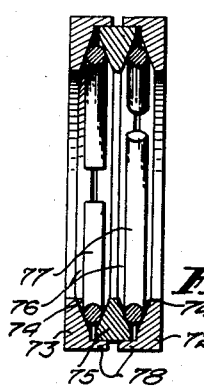
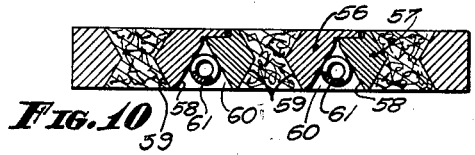
INVENTOR.
OSWALD A. WRIGHT
BY
*Lyon & Lyon*
ATTORNEYS United States Patent Office 2,895,758
Patented July 21, 1959

2,895,758
MECHANICAL COMPENSATOR
Oswald A. Wright, Los Angeles, Calif.
Application June 9, 1954, Serial No. 435,402
7 Claims. (Cl. 288—7)

My invention relates to mechanical compensators for packing glands, and included in the objects of my invention are:

First, to provide a mechanical compensator in the form of a ring capable of axial expansion and contraction and incorporating a spring element, whereby the compensator may exert a yieldable axial thrust on a packing ring or other member requiring the pressure of a continuous axial thrust.

Second, to provide a device of this class which has a wide range of applications in pump and compressor packings, bearing seals, shaft seals, noise eliminators, lantern rings, and the like.

Third, to provide a device of this class which automatically compensates for packing or seal wear, shaft collar wear, shaft, movement of a shaft between bearings and the housing, or the like, in which the compensator is mounted.

Fourth, to provide a device of this class which facilitates packing lubrication and pressure equalization by permitting access from the interior of the housing to the packing or the like.

Fifth, to provide a device of this class which may be constructed in various forms to meet a wide range of uses and conditions of installation and service.

Sixth, to provide a device of this class which may be arranged for nonrotation or rotation, and if rotated may be arranged to apply increased axial thrust or decreased axial thrust with increased shaft speed, as desired.

With the above and other objects in view, as may appear hereinafter, reference is directed to the accompanying drawings, in which:

Figure 1 is a fragmentary sectional view of a packing gland, showing adjacent portions of a shaft and housing and incorporating one embodiment of my mechanical compensator;

Fig. 2 is a transverse sectional view, taken through 2—2 of Fig. 4, of one form of my mechanical compensator shown in its collapsed position;

Fig. 3 is a similar transverse sectional view, taken along the same plane as Fig. 2, showing the mechanical compensator in its expanded position;

Fig. 4 is a partial end, partial sectional view of one embodiment of my mechanical compensator;

Fig. 5 is a sectional view similar to Fig. 1, showing a modified form of my mechanical compensator in its retracted position, and indicating an expanded position by broken lines;

Fig. 6 is a fragmentary sectional view, showing a further modified form of my mechanical compensator;

Fig. 7 is a similar fragmentary transverse sectional view, showing a further modified form of my mechanical compensator;

Fig. 8 is a fragmentary sectional view of a mechanical seal, showing adjacent portions of a shaft and housing, and illustrating a further modified form of my mechanical compensator;

Fig. 9 is a fragmentary sectional view, showing a still further modified form of my mechanical compensator;

Fig. 10 is a fragmentary sectional view of a further modified form of my mechanical compensator;

Fig. 11 is a transverse sectional view, showing a still further modified form of my mechanical compensator employing split rings; and Fig. 12 is a still further modified form of my mechanical compensator.

Reference is first directed to Figs. 1 through 4. In the embodiment of my invention herein illustrated, I employ a pair of wedge rings 1 and 2 which are adapted to fit around a shaft or similar member, and are provided with sloping confronting faces 3 which define an annular V-channel 4. Remote faces 5 of the wedge rings are preferably flat and parallel.

The V-channel 4 is adapted to receive a spreader spring 6. In this embodiment of the invention, the spreader spring 6 is shown in the form of a helically coiled spring bent into torus form. The extremities of the coil spring 6 abut each other or may be joined together. The normal peripheral length of the spreader spring 6 is greater than the annulus defined by the V-channel 4, so that the spring tends to increase in diameter and exert a thrust on the sloping faces 3 which causes a corresponding axial thrust on the wedge rings 1 and 2.

One application of my mechanical compensator is illustrated in Fig. 1, wherein the mechanical compensator is located within a packing gland between a housing A and shaft B. The packing gland includes a plurality of packing rings C between which are interposed one or more mechanical compensators. The packing gland may be provided with its conventional packing nut D. The tendency of the spreader spring 6 to expand exerts an axial force on the wedge rings 1 and 2, which is transmitted to the packing rings C on either side thereof. As the packing rings wear, the mechanical compensator expands axially to maintain proper load on the packing rings so as to ensure a seal.

If desired, the outer side of the wedge ring 1 may be provided with an axially extending lip 7 which telescopes over the mating wedge ring 2.

Reference is now directed to Fig. 5. In this construction, a pair of wedge rings 8 and 9 are illustrated which are essentially the same as the wedge rings 1 and 2, except that they are provided with sloping faces 10 diverging laterally outward instead of radially inward so as to form a radially outwardly directed V-channel 11. The remote faces 12 of the wedge rings 8 and 9 are flat and parallel, as in the first described structure.

The radially inner margin of the wedge ring 8 may be provided with an axially directed lip 13 which fits within the mating wedge ring 9. In this construction, the spreader spring 14 is connected at its extremities in order that its convolutions may be placed under tension so that the spreader spring 14 tends to contract in diameter and thus cause axial expansion of the wedge rings 8 and 9.

The mechanical compensator illustrated in Fig. 5 is employed in the manner of the first described structure.

Reference is now directed to Fig. 6. In this construction, wedge rings 15 and 16 are provided which have confronting sloping faces 17, forming a V-channel 18 and parallel remote faces 19. In this construction, the V-channel is enclosed by means of axially directed lips 20 and 21 extending from the radially inner and outer sides of the wedge rings. It should be observed that either the top or bottom side of the construction, as shown in Fig. 6, may constitute the radially inner side. Fitted between the wedge rings 15 and 16 is a spreader spring 22 which may act in compression or tension, depending upon which side constitutes the radially inner side of the wedge ring.

Reference is now directed to Fig. 7. In this construction, there is provided a single wedge ring 23 having a sloping face 24 which confronts an abutment ring 25 having a flat face. However, the confronting face of the abutment ring 25 forms with the sloping face of the wedge ring an annular V-channel 26. This construction may be provided with axially directed lips 27 and 28 as in the construction shown in Fig. 6, or either or both of these lips may be omitted. The V-channel 26 receives a spreader spring 29 which may be arranged to expand or contract, depending upon which side of the wedge ring and abutment ring constitutes the radially inner side.

Reference is now directed to Fig. 8. In this construction, a pair of end rings 30 and 31 are provided. The end ring 30 is provided with an axially extending skirt 32 which overlies the end ring 31 and is connected thereto against relative rotation by one or more slots 33 and pins 34. The end ring 30 may be secured to a shaft B by a set screw 35. Between the two end rings 30 and 31 there is formed an internal channel which receives one or more wedge rings 36, both axial faces of which slope.

The confronting axial surface of the end ring 30 within the skirt 32 defines a sloping face 37, and fitted against the end ring 31 is an adapter ring 38 having a sloping face 39. The wedge rings 36 and sloping faces 37 and 39 define a series of V-channels 40. In this construction the V-channels are shown as diverging radially inward, but it should be understood that the direction of slope may be reversed so that the V-channels slope radially outward. Fitted within the V-channels is a series of spreader springs 41 which, in the construction illustrated, tend to expand so as to axially displace the end ring 31 from the end ring 30. The assembly comprising the end rings and intervening wedge rings may be incorporated in otherwise conventional packing glands wherever axial thrust is desired.

One application is illustrated wherein the end ring 31 is provided with a sealing face 42 adapted to bear against a seal ring E held in place by a retainer ring F. In addition, the adapter ring 38 may be provided with a lip 43 which fits into a recess formed at the radially inner side of the end ring 31, to define an O-ring channel which receives an O-ring 44 to prevent escape of fluid between the end ring 31 and the shaft on which it is mounted.

Reference is now directed to Fig. 9 which may be employed in the same manner as that shown in Fig. 8. In this construction, end rings 45 and 46 are provided between which are disposed one or more wedge rings 47 having sloping surfaces on both axial sides. The confronting ends of the end rings 45 and 46 are provided with wedge faces 49 which define, with the wedge rings 47, a series of V-channels 50. As in the other previously described structure, the V-channels may be considered as diverging radially inward or radially outward, depending upon which side of the construction shown in Fig. 9 is formed to constitute the radially outer side of the mechanical compensator.

The V-channels 50 receive spreader springs 51 which are arranged to exert force in a direction to spread the wedge rings and end rings. In this construction, one of the end rings and each of the wedge rings 47 is provided with an axially directed lip 52 overlying the succeeding ring and provided with one or more slots 53 to engage pins 54 on the succeeding ring so as to prevent relative circumferential displacement. If desired, the appropriate side of the end ring 46 may be provided with an O-ring groove 55.

Reference is now directed to Fig. 10. This construction is essentially the same as the first described structure with the exception that the mechanical compensator is particularly arranged for use in conjunction with chevron packing glands. A pair of wedge rings 56 and 57 are provided which have confronting wedge faces 58 and chevron formed outer faces 59. The wedge faces 58 define a V-channel 60 which receives a spreader spring 61. As in the previously described structures, either the top or bottom side of the mechanical compensator, as shown in Fig. 10, may be considered the radially outer side, and the spreader spring is designed to exert a radially outer or radially inner thrust accordingly.

Reference is now directed to Fig. 11. The mechanical compensator here illustrated may take the form of any of the previously described structures, the essential difference being that the wedge rings are split transversely to form two or more sections, so that the rings may be placed around a shaft and do not need to be slipped axially thereon. It is preferred, however, that means be provided to retain the wedge rings in annular form. Thus, a pair of split wedge rings 62 and 63 are illustrated having confronting wedge surfaces 64 defining a V-channel 65. The radially outer peripheries of the wedge rings 62 and 63 are provided with external grooves 66 and 67 which receive retainer rings 68 and 69. The retainer rings are split rings of spring material so that they may be stretched over the wedge rings and snapped into their respective grooves 66 and 67.

As in the previously described structures, one or both of the wedge rings 62 and 63 may be provided with an axial lip 70. Also as in the previously described structures, a spreader spring 71 is fitted in the V-channel 65. It should be recognized that in practice the wedge rings are retained within a housing so that the retainer rings 68 and 69 are not called upon to resist the thrust of the spreader spring 71.

In the previously described structures, the spreader spring has been shown as a coil spring bent into torus form. In some instances, however, it is not necessary to use a coil spring; instead, a split ring of spring material may be employed. This is illustrated in Fig. 12. While the split-ring type of spreader spring is shown in conjunction with one form of mechanical compensator, it should be understood that this type may be employed in conjunction with the other mechanical compensator constructions illustrated.

In Fig. 12, a pair of outer rings 72 and 73 are provided which have wedge faces 74. Disposed between the outer rings is one or more wedge rings 75. The wedge rings and wedge faces define a series of V-channels 76, which in this case are shown as receiving spreader springs 77 in the form of split rings of spring material. In this construction, the outer rings 72 and 73 are shown as being provided with axial lips 78 which overlie the intervening wedge ring 75.

It will be observed from the various modifications illustrated that the interaction between the spreader spring and the V-channel formed by the various wedge rings is the same, that is, the spreader spring exerts a force radially outward or radially inward to effect axial expansion of the wedge rings, or stated otherwise, to increase the axial length of the mechanical compensator and exert a yieldable force upon the packing rings or other means confonting the axial ends of the mechanical compensator.

It should be observed also that if the V-channel diverges radially inward and the mechanical compensator is mounted so as to rotate with the shaft on which it fits, the axial thrust exerted by the mechanical compensator will increase with increased shaft rotation due to application of centrifugal force on the speader spring. Thus if the packing gland, or other sealing means with which the mechanical compensator is employed, requires extra sealing pressure at higher speeds of shaft rotation, this is automatically accomplished. On the other hand, if it is desired to have decreased axial pressure upon increased shaft rotation, the V-channel may face radially outward so that the centrifugal force exerted on the spring reduces its effectiveness and decreases the axial thrust with increased shaft speed.

It should be observed that the various modifications of my mechanical compensator may be employed on reciprocating shafts as well as rotating shafts. In many instances, the V-channel will fill with lubricating fluid and serve to maintain a thin film on the shaft.

With particular regard to the construction shown in Figs. 6 and 7, wherein both radially inner and radially outer lips are provided, it has been found that these constructions are particularly suitable in those installations where the axial pressure is substantial, as these lips minimize any tendency of the outside faces to be forced into nonparallel relation.

It will be observed that the amount of axial thrust may be varied by varying the angle of the size of the V-groove and by varying the size of the spreader spring used.

Having fully described my invention, it is to be understood that I do not wish to be limited to the details herein set forth, but my invention is of the full scope of the appended claims.

I claim:

1. In combination with a packing gland for a shaft, wherein means defines a cavity surrounding the shaft and adapted to receive compressible packing material, and a packing collar is axially movable into said cavity to compress said packing, of a compensator, comprising: a pair of continuous unbroken radially rigid annular rings having relatively inclined confronting faces to define an annular V-groove; an annular spring disposed in said V-groove and tending to spread said rings axially; said compensator having external walls disposed substantially at right angles to the axis of said shaft and being interposed between said packing material to maintain said packing material under axial compression between adjustments of said packing collar; said annular rings defining an annular lubricant-receiving channel for the supply of lubricant to the packing material on either axial side thereof.

2. A compensator as set forth in claim 1, wherein: the walls of said V-groove converge radially outward; and said annular spring tends to increase its diameter.

3. A compensator as set forth in claim 1, wherein: the walls of said V-groove diverge radially outward; and said annular spring tends to decrease its diameter.

4. A compensator as set forth in claim 1, wherein: said annular rings include axially extending lips at their radially inner and outer sides enclosing said V-groove.

5. A compensator as set forth in claim 1, wherein: said annular rings are split radially into complementary segments and split compression rings are fitted around said annular rings.

6. A compensator as set forth in claim 1, wherein: said spring is a split ring.

7. A compensator as set forth in claim 1, wherein: said spring is a toroidal coil spring.

References Cited in the file of this patent

UNITED STATES PATENTS

| | | |
|---|---|---|
| 978,310 | Kruger | Dec. 13, 1910 |
| 1,566,462 | Bashline | Dec. 22, 1925 |
| 1,566,816 | Carlson | Dec. 22, 1925 |
| 1,764,701 | Spreen | June 17, 1930 |
| 1,861,275 | Hopkins | May 31, 1932 |
| 1,976,916 | Black | Oct. 16, 1934 |
| 2,017,615 | Bary | Oct. 15, 1935 |
| 2,210,823 | Victor et al. | Aug. 6, 1940 |

FOREIGN PATENTS

| | | |
|---|---|---|
| 10,979 | Great Britain | June 6, 1894 |
| 8,250 | Great Britain | Apr. 11, 1904 |
| 452,011 | Germany | Nov. 4, 1927 |